United States Patent [19]
Constable

[11] Patent Number: 5,770,945
[45] Date of Patent: Jun. 23, 1998

[54] SEAFLOOR MAGNETOTELLURIC SYSTEM AND METHOD FOR OIL EXPLORATION

[75] Inventor: Steven C. Constable, San Diego, Calif.

[73] Assignee: The Regents of the University of California, San Diego, Calif.

[21] Appl. No.: 670,939

[22] Filed: Jun. 26, 1996

[51] Int. Cl.[6] .............................. G01L 3/08; G01R 33/02
[52] U.S. Cl. ............................................ 324/350; 324/345
[58] Field of Search .......................... 324/350, 347–349, 324/323, 244, 260, 329, 326, 66, 67

[56] References Cited

U.S. PATENT DOCUMENTS

| | | | |
|---|---|---|---|
| 3,514,693 | 5/1970 | Cagniard | 324/350 |
| 3,828,241 | 8/1974 | Ward | 324/0.5 R |
| 3,986,207 | 10/1976 | Gerbel et al. | 324/350 |
| 4,349,781 | 9/1982 | Vozoff | 324/346 |
| 4,473,800 | 9/1984 | Warner | 324/349 |
| 4,591,791 | 5/1986 | Bostick, Jr. | 324/350 |
| 4,617,518 | 10/1986 | Srnka | 324/365 |
| 4,663,593 | 5/1987 | Nekut, Jr. | 324/345 |
| 4,686,475 | 8/1987 | Kober et al. | 324/349 |
| 4,686,476 | 8/1987 | Ranganayaki | 324/350 |
| 4,757,262 | 7/1988 | Bostick, Jr. | 324/350 |
| 4,792,761 | 12/1988 | King et al. | 324/350 |
| 5,041,792 | 8/1991 | Thompson | 324/350 |
| 5,327,089 | 7/1994 | Ouellette | 324/345 |
| 5,373,443 | 12/1994 | Lee et al. | 364/420 |
| 5,439,800 | 8/1995 | Thompson | 435/9 |

OTHER PUBLICATIONS

*Geotools*, brochure, Geotools Corporation, May, 1994.
Rapid Inversion of Two–And Three–Dimensional Magnetolluric Data, by J. Torquil Smith and John R. Booker, *Journal of Geophysical Research*, vol. 96, No. B3, pp. 3905–3922, Mar. 10, 1991.
Three–Dimensional Magnetotelluric Modeling Using Difference Equations—Theory And Comparisons To Integral Equation Solutions by Randall L. Mackie, Theodore R. Madden, and Phillip E. Wannnamaker, *Geophysics*, vol. 58, No. 2 (Feb. 1993); pp. 215–226.

A Stable Finite Element Solution For Two–Dimensional Magnetotelluric Modeling by Phillip E. Wannamaker, John A. Stodt and Luis Rijo,*Geophys*. J.R. astr. Soc. (1987) 88, 277–296.

(List continued on next page.)

*Primary Examiner*—Walter E. Snow
*Attorney, Agent, or Firm*—Brown, Martin, Haller & McClain

[57] ABSTRACT

The magnetotelluric system for seafloor petroleum exploration comprises a first waterproof pressure case containing a processor, AC-coupled magnetic field post-amplifiers and electric field amplifiers (the "logger unit"), a second waterproof pressure case containing an acoustic navigation/release system, four silver-silver chloride (Ag-AgCl) electrodes mounted on booms and at least two magnetic induction coil sensors. These elements are mounted together on a plastic and aluminum frame along with flotation devices and an anchor for deployment to the seafloor. The acoustic navigation/release system serves to locate the system by responding to acoustic pings generated by a shipboard unit and receives a release command which initiates detachment from the anchor so that the buoyant package floats to the surface for recovery. The electrodes used to detect the electric field are configured as grounded dipole antennas. Booms by which the electrodes are mounted onto frame are positioned in an "X" configuration to create two orthogonal dipoles, which are used to measure the complete vector electric field. The magnetic field sensors are multi-turn Mu-metal core coils which detect within the frequency range typically used for land-based MT surveys. The magnetic field coils are encased in waterproof pressure cases and are connected to the logger package by high pressure waterproof cables. The logger unit includes the amplifiers for amplifying the signals received from the various sensors, which signals are then provided to the processor which controls timing, logging, storing and power switching operations. Temporary and mass storage is provided within and/or peripheral to the processor.

34 Claims, 7 Drawing Sheets

OTHER PUBLICATIONS

*BF–4 Magnetic Field Induction Senor,* EletroMagnetic Instruments, Inc. product brochure, Feb. 1994.

12th Workshop On Electromagnetic Induction In The Earth, *Brest* 1994 (Aug. 8–13) 3rd circular and proceedings, cover sheet, inside cover, pp. 1 and 52.

The Magnetotelluric Method In The Exploration Of Sedimentary Basins, by Keeva Vozoff, Reprint from *Geophysics,* 37, 98–141, pp. 649–692.

Marine Electromagnetic Induction Studies by S.C.Constable, *Surveys in Geophysics 11,* 1990, pp. 303–326.

A Seafloor Electric Field Instrument by S.C. Webb, S.C. Constable, C.S. Cox, and T.K. Deaton *J. Geomag. Geoelect.,* 37, 1985, pp. 1115–1129.

*Magnetotelluric Exploration For Hydrocarbons,* by Arnold S. Orange, *Proceedings of the IEEE,* vol. 77, No. 2, Feb., 1989, pp. 287–317.

Subsalt Imaging Via Seaborne Electromagnetics, by G.M. Hoversten and Martyn Unsworth, May, 1994, *Offshore Technology Conference* 7400.

Marine Magnetotellurics For Petroleum Exploration 1. A Seafloor Equipment System by S. Constable, A. Orange, G.M. Hoversten and H.F. Morrison, May. 21, 1996, Manuscript for submission to *Geophysics,* pp. 1–19.

SEAFLOOR MAGNETOTELLURIC SYSTEM AND METHOD FOR OIL EXPLORATION

FIELD OF THE INVENTION

The present invention relates generally to methods for measuring the electrical conductivity of the seafloor, and, more specifically, to the use of a magnetotelluric method and system for mapping electrical conductivity of the seafloor.

BACKGROUND OF THE INVENTION

One of the most common methods of oil exploration utilizes seismic reflection from subsurface structure, however, for purposes of seafloor exploration, seismic imaging is sometimes difficult due to large velocity contrasts that occur where salt, volcanic, carbonate, or other sequences are present within the sediment. Therefore, another well-known method, which measures electrical conductivity of the seafloor, is often used. Principal factors affecting the conductivity of the earth's materials include temperature, pressure, saturation with fluids, structure, texture, composition and electrochemical parameters. Electrical conductivity measurement techniques can generally be divided into two categories: active and passive.

In the former technique, a controlled source of electric current, either direct current or low frequency (<1 MHz) alternating current, is provided at a predetermined spacing from receiver electrodes. Examples of such methods are discussed in U.S. Pat. No. 4,617,518 of Srnka, entitled "Method and Apparatus for Offshore Electromagnetic Sounding Utilizing Wavelength Effects to Determine Optimum Source and Detector Positions", U.S. Pat. No. 5,373,443 of Lee et al., entitled "Method for Imaging with Low Frequency Electromagnetic Fields", U.S. Pat. No. 5,439,800 of Thompson, entitled "Offshore Petroleum Exploration System", and an article authored by the inventor entitled "Marine Electromagnetic Induction Studies", published in *Surveys in Geophysics* 11, pp. 303–327, 1990, each of which is incorporated herein by reference. The controlled source methods have become almost routine for mapping of the electrical conductivity of the seafloor in very shallow to moderately deep ocean water, achieving penetration depths as great as 30 km in 5 km of water. However, the controlled source method is limited in the depth of penetration, since deep structure can only be mapped using large source-receiver offsets and a very powerful transmitter in deep water over resistive terrains. In shallow water (1 to 1000 m), energy propagates through the atmosphere and introduces noise into the seafloor signal, which is already difficult to measure in conductive terrain. Further, the operation of a transmitter is expensive and technologically demanding.

The passive methods use natural variations in the earth's magnetic field as the source of energy, primarily from the ionosphere and magnetosphere. Because of their distance from the earth and their large scale, the resulting magnetic fields at the surface of the earth are uniform over large distances (hundreds of kilometers.) The most popular of these methods, the magnetotelluric (MT) method, employs time series measurements of orthogonal components of the electric and magnetic fields, which defines a surface impedance. This impedance, observed over a broad band of frequencies and over the surface, determines the electrical conductivity distribution beneath that surface, with horizontal layers of the earth being mathematically analogous to segments of a transmission line.

A number of patents have been issued covering MT methods for general geophysical exploration on land, including U.S. Pat. No. 4,591,791 of Bostick, Jr., entitled "Electromagnetic Array Profiling Survey Method", and U.S. Pat. No. 4,663,593 of Nekut, Jr., entitled "Method of Electromagnetic Exploration", the disclosures of which are incorporated herein by reference. General MT methods are also well documented in the literature, for example, to name a few, the above-identified article by the inventor; K. Vozoff, "The Magnetotelluric Method in the Exploration of Sedimentary Basins", *Geophysics,* 37, pp. 98–141, 1972; A. Orange, "Magnetotelluric Exploration for Hydrocarbons", *Proceedings of the IEEE*, Vol. 77, No. 2, Feb. 1989; "Three-Dimensional Magnetotelluric Modeling Using Difference Equations—Theory and Solutions", *Geophysics,* 58, pp. 215–226, 1993, each of which is incorporated herein by reference.

The MT method has been used on land for commercial oil exploration for about 30 years, but has been used only for academic research for mapping very deep structure on the seafloor. The primary reason for the limited use of MT for seafloor mapping is that high frequencies are rapidly attenuated by seawater, leading to a dramatic loss of electric and magnetic field power on the seafloor at periods shorter than 1000 seconds. However, to be useful for mapping continental shelf structure at depths relevant to petroleum exploration, MT measurements need to be made at periods between 1 and 1000 seconds. The academic systems use sensors that are direct current- (DC) coupled to seawater to measure the electric and magnetic fields, and are limited to estimates of the MT response at frequencies below about 0.01 Hz. Such low frequencies are sensitive to structure deeper than about 50 km, which, while useful for analysis of upper mantle conductivity structure, make such a system useless for petroleum exploration. Nonetheless, since the MT method is considerably less expensive and easier to implement than the controlled source method, it would be a significant advantage to provide an MT system and method which is not subject to the existing frequency limitations.

SUMMARY OF THE INVENTION

It is an object of the present invention to provide a seafloor magnetotelluric system which can measure seafloor conductivity using frequencies on the order of 1 Hz, much higher than frequencies used in the prior art.

It is a further object of the invention to provide a method of seafloor oil exploration using magnetotelluric methods.

Still another object of the invention is to combine an AC-coupled electric field amplifier with an induction coil to measure magnetotelluric parameters on the seafloor.

In an exemplary embodiment, the MT system comprises a first waterproof pressure case containing a processor, magnetic field post-amplifiers, electric field amplifiers and a compass (the "logger" unit), a second waterproof pressure case containing an acoustic navigation/release system, four silver-silver chloride (Ag-AgCl) electrodes mounted on booms and at least two magnetic induction coil sensors. These elements are mounted together on a plastic and aluminum frame along with flotation devices and an anchor for deployment on the seafloor.

The acoustic navigation/release system serves to locate the system by responding to acoustic pings generated by a ship-board unit and also receives commands, including a release command which initiates detachment from the anchor so that the buoyant package floats to the surface for recovery.

The electrodes, which are used to detect the electric field, are grounded dipole antennas. The booms by which the electrodes are mounted onto frame are positioned in an "X" configuration to create two orthogonal dipoles, which are used to measure the complete vector electric field.

The magnetic field sensors are multi-turn Mu-metal core coils which are typically used for land-based MT surveys. Three coils can be used to record the full three-dimensional magnetic field vector, while two (both horizontal) can be used to reduce weight, and improve buoyancy and stability. The magnetic field coils are encased in waterproof pressure cases and are connected to the logger package by high pressure waterproof cables.

The logger unit includes the amplifiers for amplifying the signals received from the various sensors, which signals are then provided to the processor which controls timing, logging, storing and power switching operations. Temporary and mass storage is provided within and/or peripheral to the processor. The logger unit and the remote sensors must be synchronized for data acquisition. This is achieved by on-board clocks which are started using a GPS time standard.

For operation of the system for measurement, the processor is started and an accurate time set, the compass is set and installed, an anchor is attached and the acoustic release is set and tested. The system is released from the side of a ship and allowed to sink to the seafloor. The system collects time series of electric and magnetic field variations for anywhere from several hours to several days. Upon transmission of the acoustic release signal from the ship, the anchor cable is severed and the system rises to the surface where it is recovered. The stored data is transferred to a processing system for analysis and data output.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENT

Figure 1:
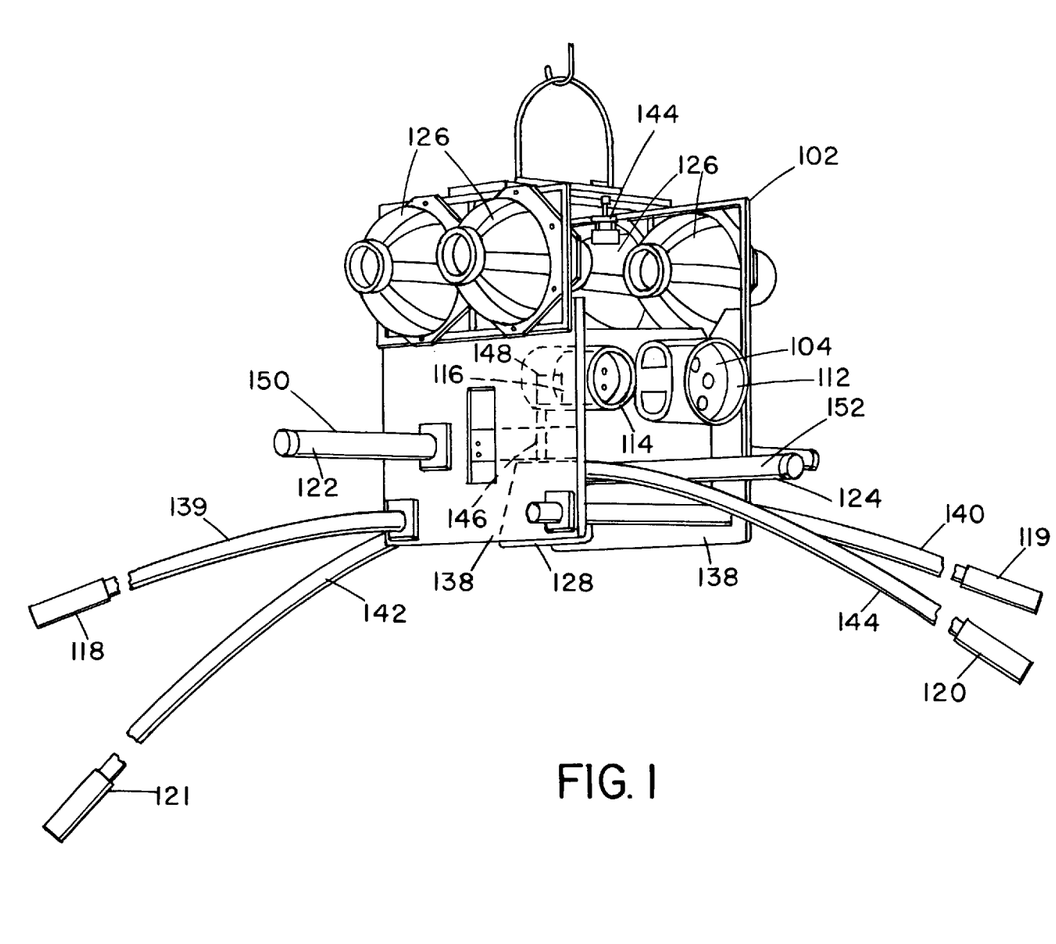
FIG. 1 is a diagrammatic perspective view of the remote sensor unit with electric and magnetic field sensors.

As illustrated in FIG. 1, the preferred embodiment of the MT measurement system for seafloor oil exploration can be roughly grouped into four units. The first unit, the logger unit, includes a 4-channel digital data logging processor 104, magnetic field post amplifier 106, electric field amplifiers 108 and 110, all contained within a first waterproof pressure case 112. The second unit is a second waterproof pressure case 114 containing an acoustic navigation/release system 116. The third unit consists of four silver-silver chloride (Ag-AgCl) electrodes 118–121 mounted on the ends of 5 meter long booms 139–142. The fourth unit includes magnetic induction coil sensors 122,124. (Note that a third magnetic sensor can be used to measure the vertical magnetic field, but is not illustrated.) Each of the elements of the system are mounted on a corrosion-resistant plastic and aluminum frame 102 along with glass spheres 126 for flotation and an anchor 128 for deployment to the seafloor.

Figure 2:
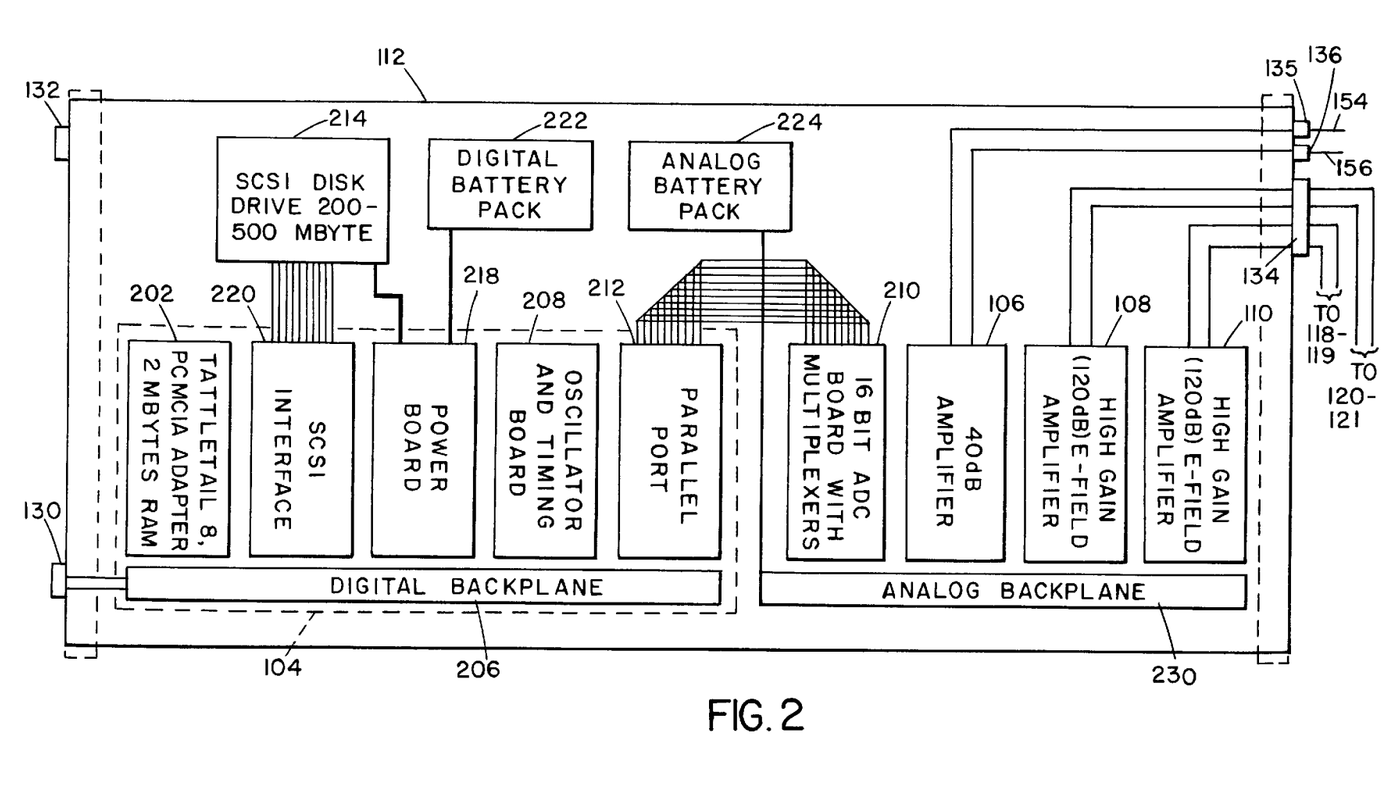
FIG. 2 is a block diagram of the logger unit.

Referring to FIG. 2, pressure case 112 comprises a 15 cm inside-diameter aluminum tube which is anodized and painted for corrosion resistance with end caps sealed with O-rings. One endcap of pressure case 112 has ports 130,132 to provide access to the processor 104 for initiating operation and to purge air from the case, respectively. The other endcap has high-pressure underwater connectors 134–136 for connection to the remote sensors. The entire system is capable of resisting water pressure to a depth of 6000 m (up to 8000 psi.) The aluminum cylinder requires added buoyancy, which can be provided by attaching a frame with flotation balls to cylinder. In the preferred embodiment, four 13 inch flotation balls manufactured by Billings were attached to a frame and attached to the pressure case. Pressure case 114 is of similar construction, with appropriate ports to allow connection to cables for electrical communication with other electrical components. Other types of pressure cases, including large capacity glass spheres, can also be used.

Referring again to FIG. 1, pressure case 11 2 is supported in polyethylene framework 138 within the overall frame 102 to protect the instruments from damage during handling. (Framework 138 is included within frame 102 because corrosion is minimized if direct contact between metals is avoided, only plastics are used to contact the pressure cases and zinc cathodic protection can be employed.) Framework 138 also supports the flotation spheres 126, the pressure case 114 containing acoustic navigation/release system 116, the magnetometer coils 122,124, the electrode booms 140,142 and a concrete anchor 128. A magnetic compass 144 records the orientation of the system after deployment on the seafloor, and may be mounted anywhere on the apparatus. In one embodiment, the compass can have a timed release to lock the needle mechanically. For example, the needle can be held in an initial position by a substance that dissolves in water, such as sugar crystals. Once released, it orients itself in the proper direction where it is mechanically locked, thus recording the system's orientation. In another embodiment, the compass can be positioned within the field of view of a photographic system which takes one or more snap shots when data is being recording. A digital compass enclosed within a pressure case and connected to the data logger may also be used to provide a signal to the data logger for recordation of the orientation.

Acoustic navigation/release system 116 provides means for locating the MT system underwater within ±1 m by ranging from known (GPS) locations on the surface, as well as means for releasing it from the seafloor at the end of the recording period. Acoustic "pings" at around 12 kHz frequency and 20 msec duration are generated by a ship-board unit 304 (see FIG. 3). A transponder within the acoustic system 116 responds with a similar ping upon receiving the signal from ship-board unit 304. As is known, acoustic range finding techniques can be used to determine the range of the MT system from the ship 302 as well as its position relative to the seafloor 306, using acoustic signal reflected from the seafloor 306. Acoustic system 116 can also receive and respond to commands sent by the ship-board unit 304 causing it to go quiet, activate, or release the MT system. Acoustic systems that provide these functions are commercially available.

During operation of the MT system, anchor 128, which is concrete weighing approximately 60 kg (air weight), is attached to the framework 138 by means of a short, nylon-insulated, stainless steel wire ("burn wire") 146, so that the anchor 128 is held close to the framework. The insulation is cut to expose a 2 mm section of wire, which is attached to the release device 148 of acoustic system 116. On receipt of the release command from the ship-board unit 404, release device 148 applies +18 V from internal batteries to the exposed section of wire. Within 5 to 30 minutes, the voltage causes the steel wire to electrolysize away, releasing the MT system from the anchor 128, permitting floats 126 to lift the MT system to the surface for recovery.

A number of underwater acoustic release systems based on burn wire and other techniques are commercially available and may be used in place of the above-described system, including those manufactured by GEODYNE, of Alberta, Canada, and BENTHOS, INC. of North Falmouth, Mass.

Referring now to FIG. 2, the data logging processor 104, which is retained within pressure case 112, is configured for four component MT operation.

The electric field, or telluric, sensors are grounded dipole antennas. Using booms 139–142, which are 5 m lengths of semi-rigid plastic (e.g., PVC or polypropylene) pipe, with a diameter on the order of 2 inches, and running insulated copper wire through the pipes, two orthogonal 10 m dipoles are created by forming the booms in an "X"-configuration. (Note that the same effect can be achieved by using two 10 m booms, since the key is to provide a total boom length corresponding to the desired length of the dipole.) Dipoles antennas of different length may be used as well, as will be apparent to those skilled in the art. The grounds at the dipole ends are provided by Ag-AgCl electrolyte-filled electrodes 118–121 which were specifically designed for the offshore environment by Scripps Institution of Oceanography and are described in an article entitled "A Seafloor Electric Field Instrument" by S. C. Webb, et al., published in *J. Geomag. Geoelectr.* 37, pp. 1115–1129, 1985, which is incorporated herein by reference. (Note that the present inventor is also a co-author.)

Figure 4:
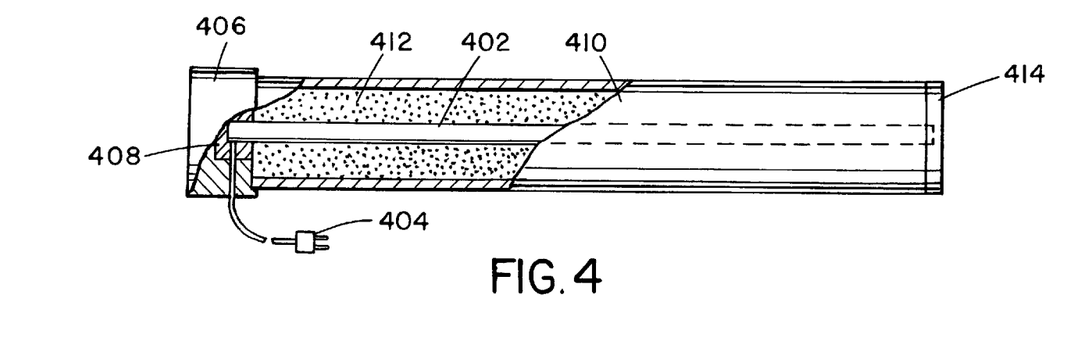
FIG. 4 is a diagrammatic view of an electrode.

The configuration of one of the Ag-AgCl electrodes 118–121 is illustrated in FIG. 4. The electrode is constructed by wrapping a 5 cm by 65 cm piece of silver foil around an inert, 1.25 cm diameter rod made of plastic or plastic-coated metal to form a silver covered rod 402. The conductor of an underwater connector 404 is soldered to one end of the silver covered rod 402, and the joint is potted into a plastic cap 406 using epoxy 408. The silver is cleaned with a 30% $HNO_3$ solution and rinsed. A tube 410 made of porous polyethylene (4 cm O.D./2.5 cm I.D.) is glued onto the cap 406, and the space between the silver rod 402 and the inner wall of tube 410 is packed with a filler 412 consisting of a mixture of diatomaceous earth and silver chloride, mixed in a ratio of 6:1 by volume. After affixing an end cap 414, the assembled electrode is immersed in a 35 g/l solution of NaCl and vented under vacuum to saturate the porous materials. In order to coat the surface of silver rod 402 with silver chloride, a piece of silver foil is also immersed in the NaCl solution and electrical connection made to it and the electrode. The electrode is made negative and a current of 1 A is passed for 20 seconds. This cleans the surface of the silver rod 402. The electrode is then made positive and a similar current is passed for 120 seconds, plating (anodizing) the surface of the rod 402 with silver chloride. It should be noted that, while details are provided for construction of a silver-silver chloride electrode, any non-polarizing electrode suitable for use in sea water may be employed.

Figure 6A:
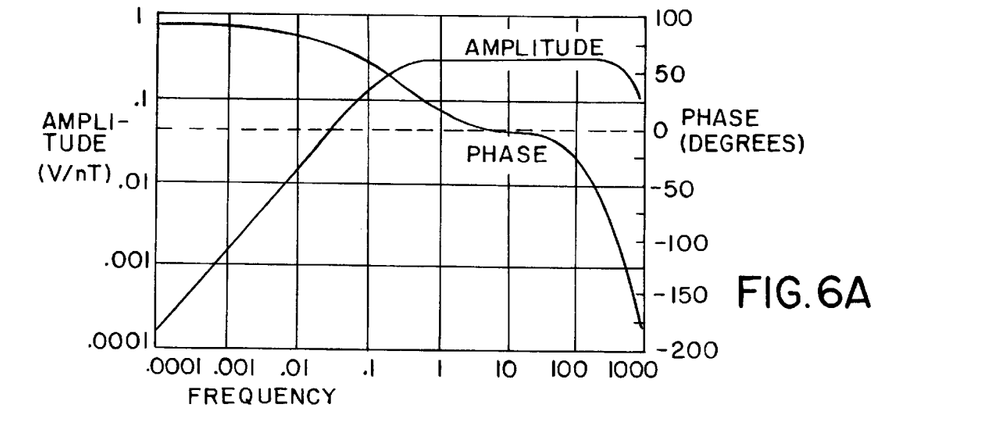
FIG. 6a is a plot of frequency response and FIG. 6b is a plot of sensor noise for the magnetometer used in the preferred embodiment of the MT system.
Figure 6B:
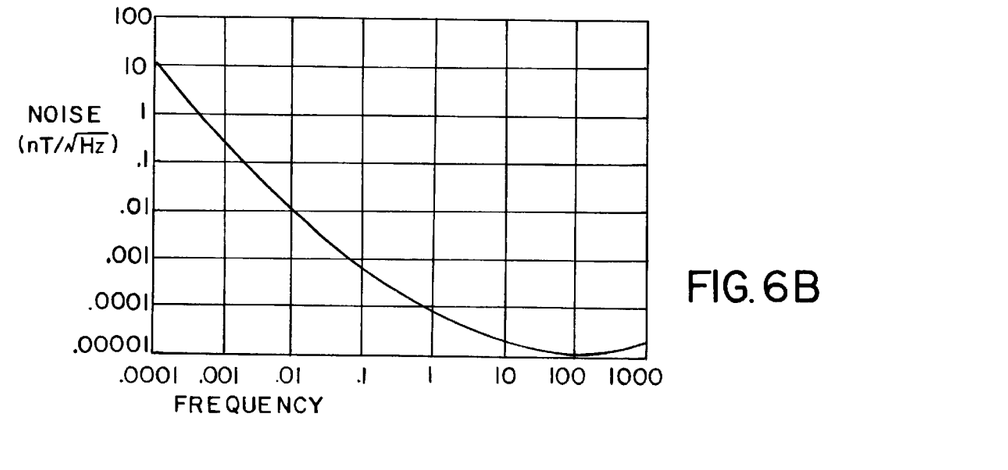

Referring again to FIGS. 1 and 2, the magnetic field sensors 122,124 (magnetometers) are multi-turn Mu-metal core coils that are commonly used for land MT surveys. The sensors, which are identified as BF-4 magnetic field induction sensors, are manufactured by and available from ElectroMagnetic Instruments (EMI), Inc. located in Richmond, Calif. The frequency response and the sensor noise performance of a BF-4 sensor are provided in FIGS. 6a and 6b, respectively. The BF-4, sensor utilizes a magnetic feedback design to provide stable response over a frequency range of 0.0001 to 1000 Hz, with 3 dB frequency corners at 0.2 Hz and 500 Hz. In the flat region, sensitivity is 0.3 V/nT (standard), with variation in amplitude of less than 0.1 dB and ±1 degree in phase between sensors. Power consumption is 12 mA at ±12 V. A matched, chopper stabilized low-noise preamplifier is connected to the coil and is powered by an external rechargeable battery within pressure case 112. The coil and preamplifier are sealed in epoxy inside an impact-resistance Nema G-10 fiberglass tube, with an 8 pin connector for external connection to short high-pressure waterproof cables 154,156. As will be apparent to those skilled in the art, other magnetic induction coils, whether commercially available or custom-made, which provide similar operating parameters can be used. Specifically, the magnetic induction coils should have a stable flat region which covers the useful frequencies for oil exploration above 0.1 Hz, and includes 1 Hz.

Each of the magnetic sensors 122,124 is encased in an aluminum pressure case 150,152 which is roughly 6 cm in diameter and 1.3 meters long, with the pressure cases 150,152 arranged orthogonally on framework 138. The pressure cases 150,152 are made in the same manner as those previously described. Using two magnetic field coils, gains in weight, buoyancy and stability of the system can be recorded. If three coils are used, arranged orthogonally to measure $H_x$, $H_y$, $H_z$, the full, three-dimensional magnetic vector can be recorded.

The output signal from each of the magnetometers 122, 124 is input into a 2-channel AC-coupled 40 dB post-amplifier 106, which also passes the ±12 V power required by the magnetometers 122,124 from battery pack 224 through analog backplane 230 to cables 154,156, as can be seen in FIG. 2. A schematic of the amplifier 106 is provided in FIG. 7. As this amplifier is a generic amplifier, selection of components will be apparent to those skilled in the art and are not provided except as noted in Table 1.

TABLE 1

| DEVICE NUMBER | REF. DES. | DESCRIPTION OF COMPONENT |
|---|---|---|
| 701 | U1 | LT1012 - Operational Amplifier |
| 702 | U2 | DP74L4B - Analog Filter |
| 703 | U3 | DP74L4B - Analog Filter |
| 704 | U4 | LT1012 - Operational Amplifier |
| 705 | U5 | DP74L4B - Analog Filter |
| 706 | U6 | DP74L4B - Analog Filter |
| 707 | R1 | Resistor - |
| 708 | R2 | Resistor - |
| 709 | R3 | Resistor - |
| 710 | R4 | Resistor - |

TABLE 1-continued

| DEVICE NUMBER | REF. DES. | DESCRIPTION OF COMPONENT |
|---|---|---|
| 711 | R5 | Resistor - |
| 712 | R6 | Resistor - |
| 713 | R7 | Resistor - |
| 714 | R8 | Resistor - |
| 715 | R9 | Resistor - |
| 716 | R10 | Resistor - |
| 717 | R11 | Resistor - |
| 718 | R12 | Resistor - |
| 719 | R13 | Resistor - |
| 720 | R14 | Resistor - |
| 721 | R15 | Resistor - |
| 722 | R16 | Resistor - |
| 723 | R17 | Resistor - |
| 724 | R18 | Resistor - |
| 725 | R19 | Resistor - |
| 726 | R20 | Resistor - |
| 727 | R21 | Resistor - |
| 728 | R22 | Resistor - |
| 729 | R23 | Resistor - |
| 730 | R24 | Resistor - |
| 731 | R25 | Resistor - |
| 732 | R26 | Resistor - |
| 733 | R27 | Resistor - |
| 734 | R28 | Resistor - |
| 735 | C1 | Capacitor - 10 $\mu$F |
| 736 | C2 | Capacitor - 10 $\mu$F |
| 737 | C3 | Capacitor - 10 $\mu$F |
| 738 | C4 | Capacitor - 10 $\mu$F |
| 739 | C5 | Capacitor - 22 $\mu$F, 35 V |
| 740 | C6 | Capacitor - 0.1 $\mu$F |
| 741 | C7 | Capacitor - 22 $\mu$F, 35 V |
| 742 | C8 | Capacitor - 0.1 $\mu$F |
| 743 | C9 | Capacitor - 0.1 $\mu$F |
| 744 | C10 | Capacitor - 0.1 $\mu$F |
| 745 | C11 | Capacitor - 0.1 $\mu$F |
| 746 | C12 | Capacitor - 0.1 $\mu$F |
| 747 | J1 | Jack |
| 748 | J2 | Jack |
| 749 | P1 | Plug |
| 750 | JP1 | Jumper |
| 751 | JP2 | Jumper |
| 752 | JP3 | Jumper |
| 753 | JP4 | Jumper |
| 754 | JP5 | Jumper |
| 755 | JP6 | Jumper |
| 756 | JP7 | Jumper |
| 757 | JP8 | Jumper |
| 758 | JP9 | Jumper |
| 758 | JP10 | Jumper |
| 760 | JP11 | Jumper |
| 761 | JP12 | Jumper |
| 762 | JP13 | Jumper |
| 763 | JP14 | Jumper |
| 764 | JP15 | Jumper |

Figure 7:
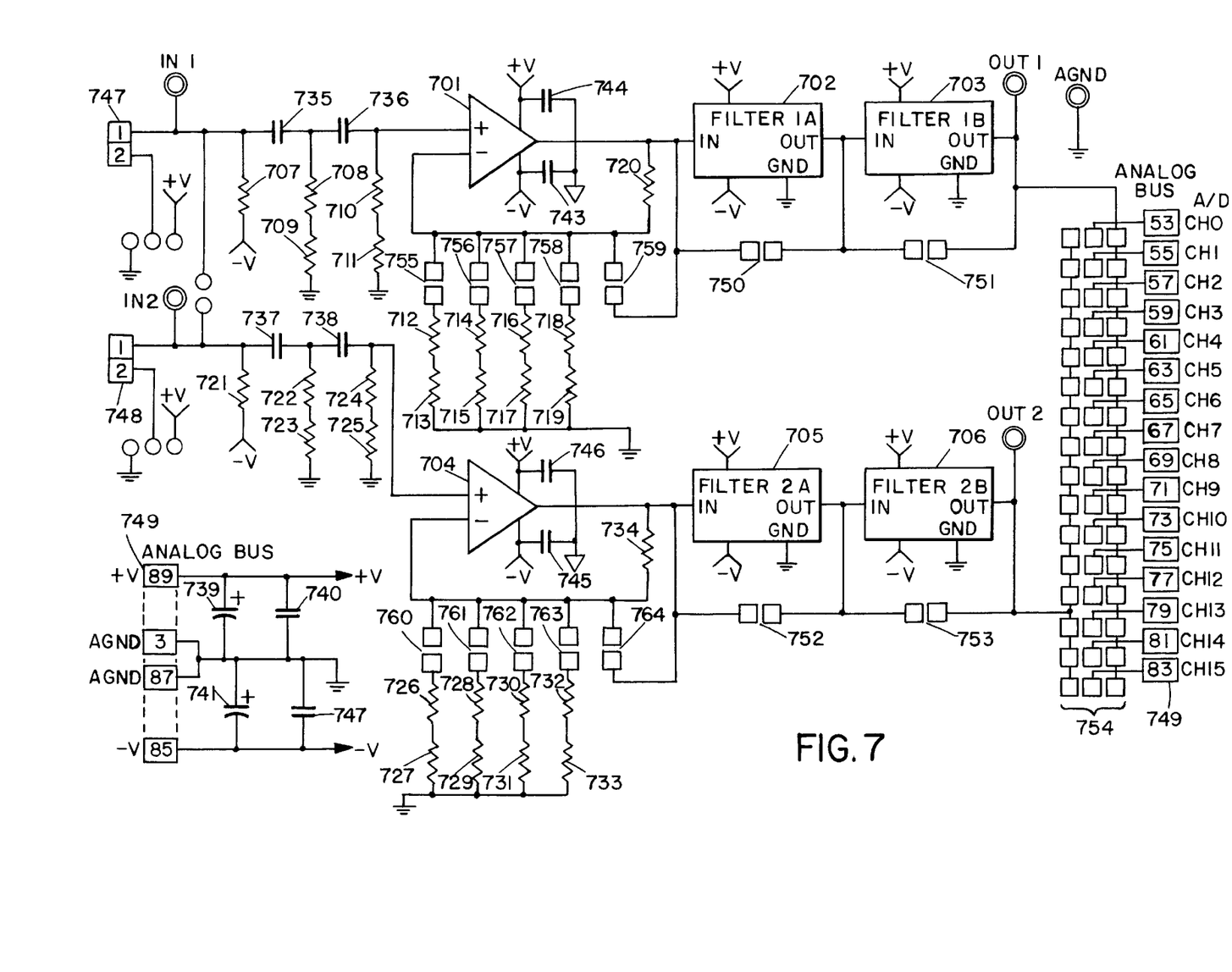
FIG. 7 is a circuit schematic for a B-field post-amplifier.

Gain setting can be accomplished by means of jumpers 755–764 on the postamplifier board, with x1, x10 and x100 available. For example, with jumper 755 jumped, the gain is, [1+(Resistor 720/Resistor 712+Resistor 713)] The long-period −3 dB point is at 2500 s.

Figure 5:
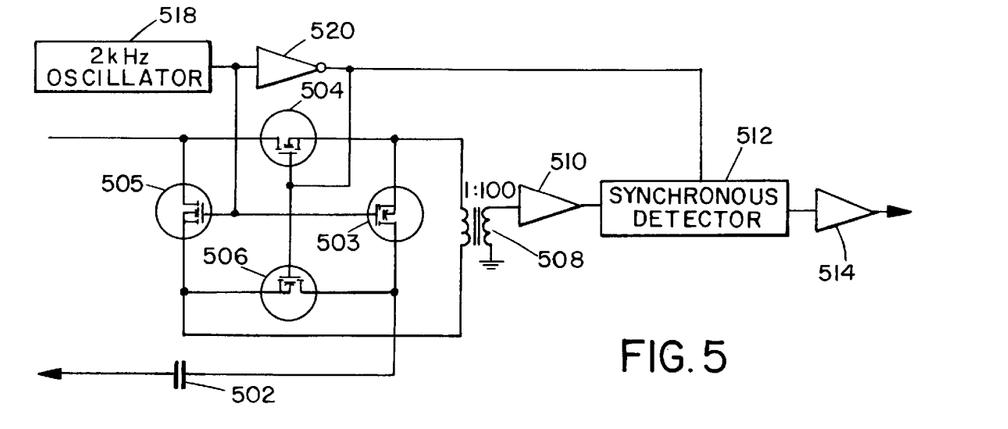
FIG. 5 is a simple circuit schematic for a low noise E-field amplifier.
Figure 8:
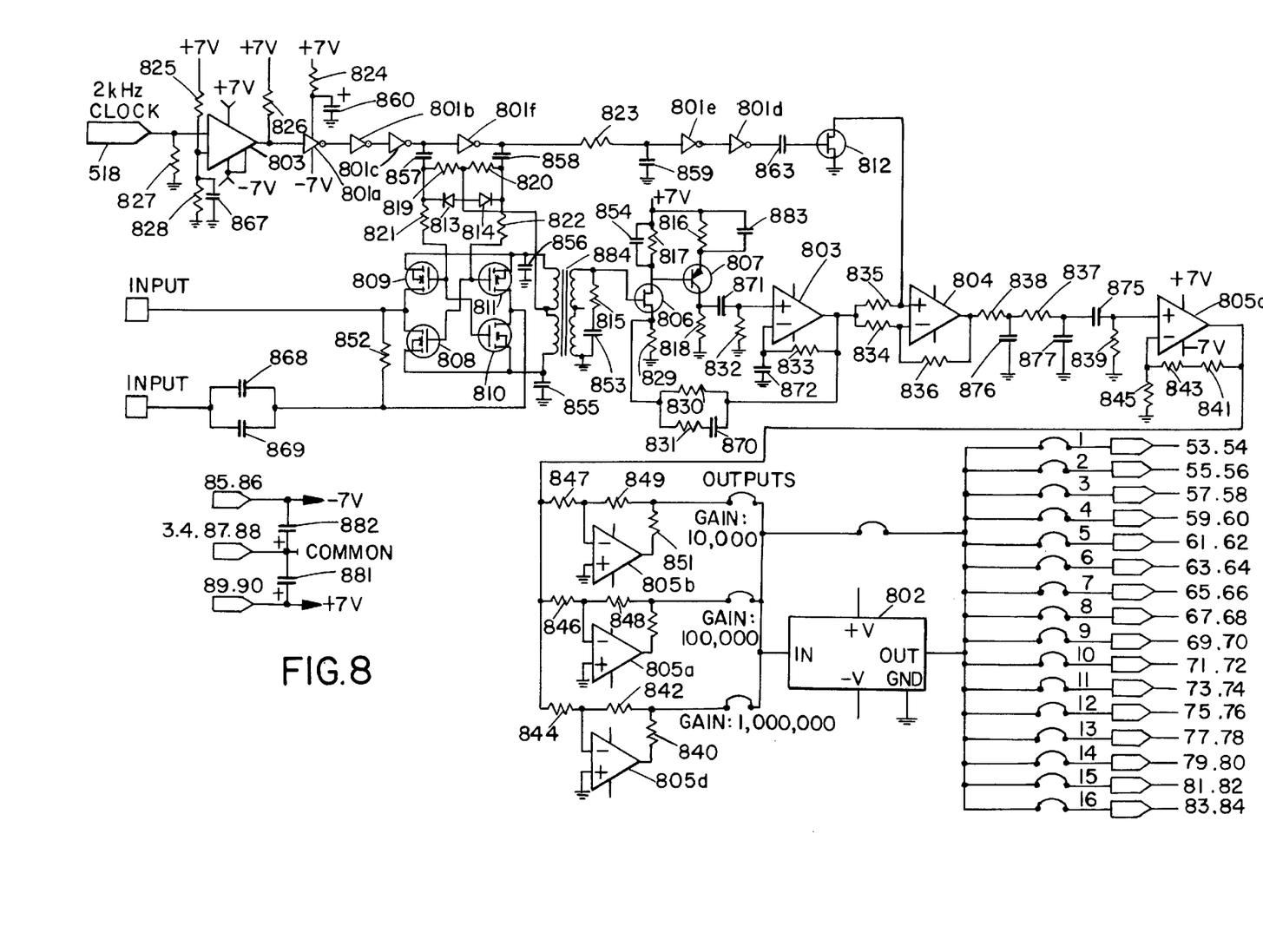
FIG. 8 is a detailed circuit schematic for a low noise E-field amplifier.
Figure 9:
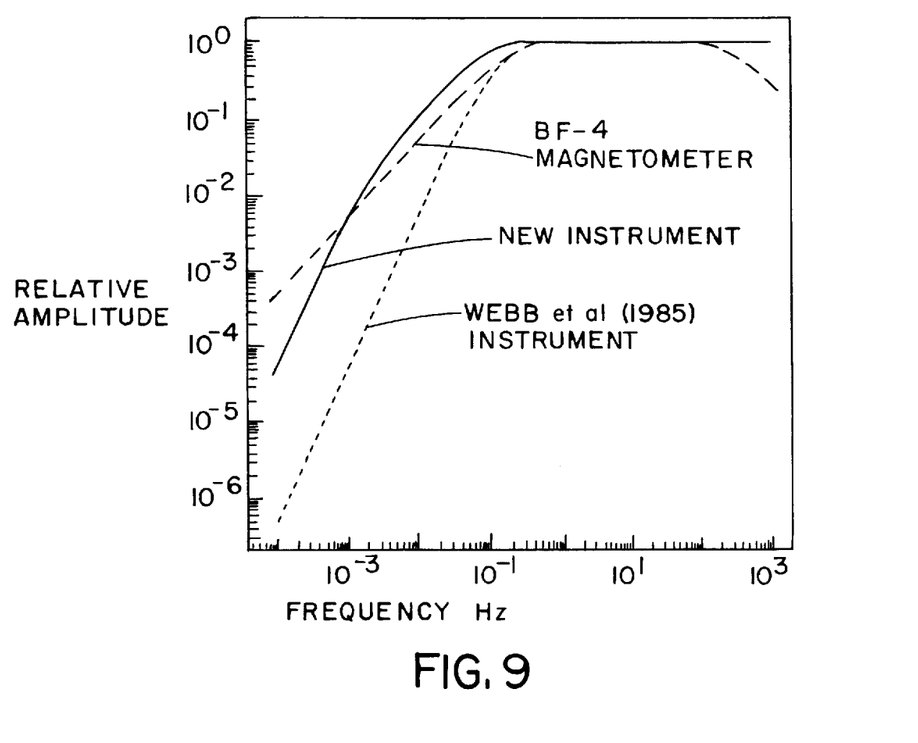
FIG. 9 is a plot comparing frequency response for the magnetic field sensors and the E-field amplifiers of FIGS. 5 and 8.

Each pair of electrodes, 118–119 and 120–121, is connected to an amplifier 108,110 developed specifically for the marine environment by Scripps Institution of Oceanography. This amplifier is briefly described in the above-identified article of Webb, et al. (1985), and a simple schematic for the amplifier circuit is provided in FIG. 5. Each amplifier 108 or 110 has very low noise (<0.13 nV/Hz$^{1/2}$) and high gain ($10^6$). The electrodes are AC coupled through a large (e.g., 15,000 to 20,000 $\mu$F) series coupling capacitor 502, to remove very large, low frequency signals associated with ocean currents and electrode drift, to a low input impedance (2700 ohm) first stage power FET chopper amplifier consisting of low-noise power FETs 503–506. The chopping frequency is 2 kHz, provided by oscillator 518 through inverters 520. The second stage is a 30:1 toroidal step-up transformer 508 which provides transformer isolation of the electrodes and impedance matching with subsequent stages, in which the signal is amplified by AC amplifier 510, demodulated and filtered at synchronous detector 512, and amplified again at low frequency amplifier 514. The −3 dB point of 0.1 Hz is designed to match the response of the magnetometers 122,124, and because of the very red nature of the electric field spectrum, allows signals at periods of 2000 seconds and longer to be monitored. A plot comparing the frequency responses of the magnetic field sensors, the E-field amplifier (108,110) of the present invention, and the E-field amplifier described by Webb, et al. (1985) is provided as FIG. 9. A more detailed schematic for the E-field amplifier used in the preferred embodiment is provided in FIG. 8, with the individual component values/identities provided in Table 2.

TABLE 2

| DEVICE NUMBER | REF. DES. | DESCRIPTION OF COMPONENT |
|---|---|---|
| 801 | U1 | 4069 - CMOS Hex Inverter |
| 802 | U2 | DP74L4B - Analog Filter |
| 803 | U3 | LP311 - Operational Amplifier |
| 804 | U4 | TL032 - Operational Amplifier |
| 805 | U5 | TLC27L9 - Operational Amplifie |
| 806 | Q1 | Transistor - 2N4867A |
| 807 | Q2 | Transistor - 2N3906 |
| 808 | Q3 | Transistor - 2N7000 |
| 809 | Q4 | Transistor - 2N7000 |
| 810 | Q5 | Transistor - 2N7000 |
| 811 | Q6 | Transistor - 2N7000 |
| 812 | Q7 | Transistor - 2N4093 |
| 813 | D1 | Diode - 1N914 |
| 814 | D2 | Diode - 1N914 |
| 815 | R1 | Resistor - 31.6 K$\Omega$ |
| 816 | R2 | Resistor - 2 K$\Omega$ |
| 817 | R3 | Resistor - 3.16 $\Omega$ |
| 818 | R4 | Resistor - 1 K$\Omega$ |
| 819 | R5 | Resistor - 1 M$\Omega$ |
| 820 | R6 | Resistor - 1 M$\Omega$ |
| 821 | R7 | Resistor - 680 $\Omega$ |
| 822 | R8 | Resistor- 680 $\Omega$ |
| 823 | R9 | Resistor - 6.2 K$\Omega$ |
| 824 | R10 | Resistor - 100 $\Omega$ |
| 825 | R11 | Resistor - 100 K$\Omega$ |
| 826 | R12 | Resistor - 20 K$\Omega$ |
| 827 | R13 | Resistor - 100 K$\Omega$ |
| 828 | R14 | Resistor - 100 K$\Omega$ |
| 829 | R15 | Resistor - 20 $\Omega$ |
| 830 | R16 | Resistor - 220 K$\Omega$ |
| 831 | R17 | Resistor - 1 K$\Omega$ |
| 832 | R18 | Resistor - 220 K$\Omega$ |
| 833 | R19 | Resistor - 49.9 K$\Omega$ |
| 834 | R20 | Resistor - 56.2 K$\Omega$ |
| 835 | R21 | Resistor - 56.2 K$\Omega$ |
| 836 | R22 | Resistor - 56.2 K$\Omega$ |
| 837 | R23 | Resistor - 249 K$\Omega$ |
| 838 | R24 | Resistor - 11.3 K$\Omega$ |
| 839 | R25 | Resistor - 1.5 M$\Omega$ |
| 840 | R26 | Resistor - 499 $\Omega$ |
| 841 | R27 | Resistor - 11.8 K$\Omega$ |
| 842 | R28 | Resistor - 2 M$\Omega$ |
| 843 | R29 | Resistor - 7.5 K$\Omega$ |
| 844 | R30 | Resistor - 20 K$\Omega$ |
| 845 | R31 | Resistor - 2 K$\Omega$ |
| 846 | R32 | Resistor - 20 K$\Omega$ |
| 847 | R33 | Resistor - 20 K$\Omega$ |
| 848 | R34 | Resistor - 200 K$\Omega$ |
| 849 | R35 | Resistor - 20 K$\Omega$ |
| 850 | R36 | Resistor - 499 $\Omega$ |
| 851 | R37 | Resistor - 499 $\Omega$ |
| 852 | R38 | Resistor - 5.62 K$\Omega$ |
| 853 | C1 | Capacitor - 220 pF |
| 854 | C2 | Capacitor - 1 nF |

TABLE 2-continued

| DEVICE NUMBER | REF. DES. | DESCRIPTION OF COMPONENT |
|---|---|---|
| 855 | C3 | Capacitor - 10 nF |
| 856 | C4 | Capacitor - 10 nF |
| 857 | C5 | Capacitor - 50 nF |
| 858 | C6 | Capacitor - 50 nF |
| 859 | C7 | Capacitor - 1 nF |
| 860 | C8 | Capacitor - 68 µF |
| 861 | C9 | Capacitor - Bypass |
| 862 | C10 | Capacitor - Bypass |
| 863 | C11 | Capacitor - 50 nF |
| 864 | C12 | Capacitor - Bypass |
| 865 | C13 | Capacitor - Bypass |
| 866 | C14 | Capacitor - Bypass |
| 867 | C15 | Capacitor - 0.1 µF |
| 868 | C16A | Capacitor - 1500 µF, 25 V |
| 869 | C16B | Capacitor - 1500 µF, 25 V |
| 870 | C17 | Capacitor - 1 nF |
| 871 | C18 | Capacitor - 1 µF |
| 872 | C19 | Capacitor - 47 µF |
| 873 | C20 | Capacitor - Bypass |
| 874 | C21 | Capacitor - Bypass |
| 875 | C22 | Capacitor - 1 µF, Polycarbonite |
| 876 | C23 | Capacitor - 0.22 µF, Ceramic |
| 877 | C24 | Capacitor - 10 nF, Ceramic |
| 878 | C25 | Capacitor - Bypass |
| 879 | C26 | Capacitor - Bypass |
| 880 | C27 | Capacitor - Bypass |
| 881 | C28 | Capacitor - 10 µF |
| 882 | C29 | Capacitor - 10 µF |
| 883 | C30 | Capacitor - 1 µF, Tantalum |
| 884 | T1 | Transformer - Pico T-22400 |

Referring again to FIG. 2, in the exemplary embodiment, the data logging processor 104 includes a microcomputer sold by from Onsett Corporation under the trademark Tattletale 8 (TT8). The microcomputer 202 is equipped with 2 MBytes of PCMCIA RAM storage and connected to a digital backplane 206 which permits control of various timing, logging, storage and power switching operations required for low power, autonomous data logging. The microcomputer 202 acquires data in RAM by controlling a 16 channel, 16 bit A/D converter 210 via a parallel interface board 212. Once the RAM buffer is filled (1 MByte), a SCSI-interfaced disk drive 214, which is detachable from the overall processor 104, is switched on by sending a control signal to the power board 218, which provides the regulated 12 V and 5 V signals required by the disk drive. Data are transferred of the SCSI interface 220 to the disk, then the disk drive 214 is powered down. Disk start up and transfer of 2 Mbytes of data takes less than 60 seconds, minimizing power consumption. The entire data logging processor, amplifier and magnetic coil systems are powered by means of rechargeable NiCd battery packs 222. Total possible recording time depends on the sampling rate. At 128 Hz sampling on 6 channels at 16 bits per datum, the smallest readily-available disk drives (250 MBytes) will collect data for 48 hours. In the test system, at 256 Hz–2 kHz maximum sampling rate, with two commercially-available 10 Gbyte disk drives, using a software data compression algorithm with about 2:1 volume reduction, several months worth of data can be collected. Other types of mass storage devices may be used, with a balance being observed between power economy and capacity.

Remote reference data acquisition requires that the base and reference sites be synchronized so that data acquisition is simultaneous. The data logging processor 104 is timed by an external crystal oscillator 208 with timing accuracy of about 1 part in $10^8$. One such device is available from SEASCAN, INC. of Falmouth, Mass., which is described as a low power, high accuracy time base module with SC cut. A 4 MHz temperature-compensated crystal oscillator available from VECTRON can be used, although its accuracy is less at 1 in $10^7$. Generally, highly accurate crystal oscillators are well known, such that selection of an appropriate device would be within the level of skill in the art, the key being a good compromise between accurate time keeping and low power consumption. Other than the data logging synchronization, phase locked loops provide all the frequencies required by the system, such as the 40 kHz CPU clock of microprocessor 202, the 2 kHz signal for the electric field amplifiers 108,110, the ADC 210 clock, sample interrupts, and the software real time clock of the microprocessor 202.

Synchronizing the processing of seafloor data with land magnetometer components requires precise timing: phases accurate to 5° at a frequency of 2 Hz requires timing to 7 msec. or better. Since all of the seafloor instruments are autonomous and beyond the reach of radio communication, accurate timing must be accomplished by on-board quartz clocks. The on-board clocks are started using a GPS time standard, with initial timing accurate to 1–10 microseconds. After recovery, the clocks are checked against the GPS standard to estimate drift or error. Typical drift rates are less than 1 msec. per day.

Mass storage within the data logging processor is primarily within the disk drive 214 in a format that can be converted to the industry standard EMI time series format. Since the disk drive 214 is easily removed from the processor 104, the MT system can be turned around quickly between deployments by swapping recently used disk drives 214 with those that have already been transcribed.

Conversion of the collected data into EMI time series format is achieved using the following procedure, which is included within the software of the system used for analyzing the data. The data is acquired in binary format, with one line per channel composed of FFT (fast Fourier transform) length successive values. Each value is written using two bytes—most significant and least significant. The total line length for 512 FFT length is 1024 plus a line feed and carriage return. After the last channel there is one line of ASCII text—the first four characters give the clock start in minutes, then an "OKAY" for status.

The MT time series data is written out as A/D count with no corrections applied for sensors, dipole lengths, direction or gain. The following are the steps for converting the data into MT units (nT for magnetic field or mV/km for electric fields.)

Convert the two bytes of binary data into an integer. The first byte is the most significant (msb) and the second is the least significant (lsb). The integer value (ival)=

$$msb \cdot 256 + lsb - 32768. \quad (1)$$

This is converted to voltage:

$$V = ival/32768 \cdot 10 \quad (2)$$

since the A/D is using a ±10 V input range.

The voltage V corresponds to the voltage on each magnetic field channel of the amplifier. To convert to sensor units, each channel must first be corrected for the channel gain. The possible gain values (G) are 3.16, 10, 31.6, 100, 316, 1000 or 3160. The input voltage ($V_{in}$) to the processor is:

$$V_{in} = V/G. \quad (3)$$

The electric field channels of the processor generally have additional gain ($G_e$) applied, making the electric field voltages $$V_8 = V_{in}/G_e. \quad (4)$$

In addition, the units of the electric field are normally presented in mV/km. This correction is obtained by multiplying the result by 1000 to convert volts to millivolts and again by 1000 to convert meters to kilometers for the dipole length (L), with the resulting E field value being:

$$E = V_e \cdot 10^6/L.$$

The magnetic field sensor has a flat transfer function response from 0.3 to 200 Hz. The these frequencies, for conversion from volts to nT, the voltage is divided by the transfer function value, which is typically 0.3 or 0.15 V/nT.

Both the magnetic and electric field sensors have a frequency dependent response correction. The processor calculates the Fourier transform of each time segment and then corrects each frequency coefficient using the calibration values for the individual sensors, which are stored in the processor's memory. The processor also applies a correction for the one pole hi-pass and four pole low-pass filters that are used during time series acquisition. All channels of the processor are matched to 1% of that, for relative comparisons, e.g., transfer functions between channels, or impedance calculations, this correction is unnecessary.

Interpretation of the data collected by the MT system uses two-dimensional forward and inverse modeling, with the inverse modeling being constrained by data obtained by other means, such as seismic imaging and gravimetric methods. The two-dimensional algorithm for forward modeling disclosed in the article of Wannamaker, et al., entitled "A Stable Finite-Element Solution for Two-Dimensional Modeling", published in *Geophys. J. Roy. Astr. Soc.*, 88, pp. 277–296 (1987), incorporated herein by reference, would be preferred. For inverse modeling, several algorithms are available including that described by deGroot-Hedline and Constable in "Occam's Inversion to Generate Smooth, Two-Dimensional Models from Magnetotelluric Data", *Geophysics*, 55, pp. 1613–1624 (1990), which is also discussed in the 1994 Hoversten, et al. article that was identified previously, both of which are incorporated herein by reference. Another algorithm which may be used is that described by Smith and Booker in their article entitled "Rapid Inversion of Two- and Three-Dimensional Magnetotelluric Data", published in *J. Geophy. Res., B*, 96, pp. 3905–3922 (1991), which is also incorporated herein by reference.

The two-dimensional forward and inverse solution of Wannamaker and deGroot-Hedlin and Constable are incorporated in the MT workstation available from GEOTOOLS CORPORATION of Austin, Tex., which is routinely used for land MT interpretation. This software runs on any SUN® or PC workstation and can be used for data processing and interpretation of data collected by the inventive seafloor MT system. In the exemplary embodiment the GEOTOOLS system identified as "MT-1" was used.

Three-dimensional forward modeling of MT data can be done using code developed by Mackie and Madden, which is reported in the article entitled "Three-Dimensional Magnetotelluric Modeling Using Difference Equations—Theory and Solutions", *Geophysics*, 59, pp. 215–226 (1993), incorporated herein by reference. (Three-dimensional inverse modeling is computationally intensive and requires a high-end workstation to be used for interpretation of field data. Other three-dimensional algorithms may be used as they become available.)

The MT system of the present invention is of use in areas where the structural geological element of interest is associated with an electrical conductivity contrast, either based on geophysical well logging, or known physical properties of the rock types involved. The use of the MT method is indicated prior to the use of seismic methods when reconnaissance information is desirable for deciding whether, and how, to deploy the more expensive seismic method. Alternatively, the MT method can be used in area of poor seismic performance, such as highly reflective sequences of volcanics, carbonates, or evaporites.

Figure 3:
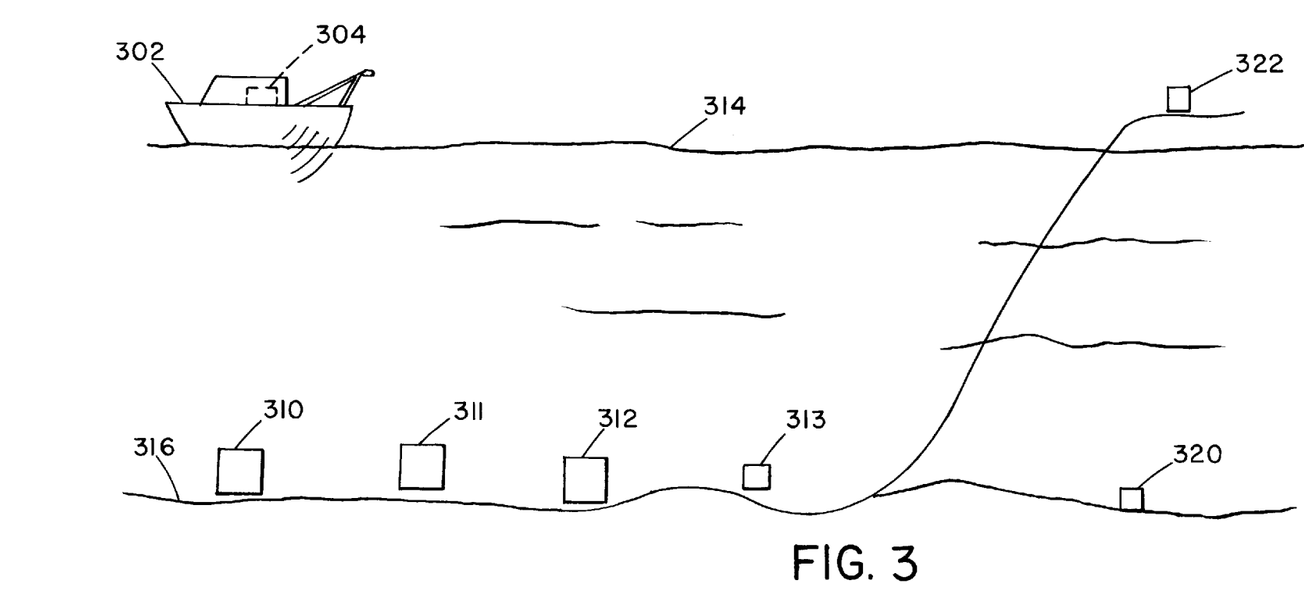
FIG. 3 is a diagrammatic view of the system as deployed for measurement.

In the preferred method for operation of the MT system, the set up of which is illustrated in FIG. 3, a remote reference recording magnetometer 320 is installed up to several hundred kilometers from the operation site for use in industry-standard remote reference processing of the seafloor data. A local reference magnetometer 322 is installed on nearby land for back-up magnetic field measurements and for verification of seafloor magnetic measurements. As shown, four seafloor MT units 310–313 are deployed repeatedly from a small vessel 302 at the surface 314 to the seafloor 316, with a bottom time of about 24 hours for each instrument. A larger number of MT units may be used. The total number of MT units depends upon area surveyed and structural complexity. Typical spacing between the MT units would be 2 km, and the typical number of deployment sites could range anywhere from 15 to 100.

Variations on use of the overall system could include deployment of several units without magnetic field sensors, instead computing the MT response using nearby seafloor or local land magnetic recordings, and varying the amount of bottom time. Also, magnetic field sensor could be placed on only a few of a total number of units deployed. Fairings can be installed around the magnetic field sensors to reduce motional noise, or the magnetic field coils (enclosed in pressure casings) can be attached to the support frame with cables so that they fall away from the frame and drop onto the seafloor once the unit has been deployed, causing the encased sensors to become partially buried in the mud or silt to provide enhanced stability. Some form of stabilization is important in shallower water where the wave activity and water currents may cause the MT unit to move even when anchored.

The inventive MT system and method provide a significant advantage over existing seafloor MT systems by allowing MT responses to be estimated at much higher frequencies than was previously thought possible. This major advance makes MT methods available for the first time for seafloor petroleum exploration.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A unit for incorporation into a system having a plurality of units for magnetotelluric mapping of the seafloor for petroleum exploration, the unit comprising:

a corrosion-resistant frame structure;

a pair of grounded dipole antennas mounted orthogonally on said frame structure, each dipole antenna comprising at least one boom having a pre-determined total length and a non-polarizable electrode suitable for use in sea water disposed at each end of said at least one boom for detecting an electrical current in seawater;

first conductor means for conducting an electric field signal representative of an electric field detected by each said dipole antenna;

an AC-coupled low input impedance, high gain electric field signal amplifier having a first low-frequency roll-off and connected to said first conductor means, for receiving said electric field signal from each said dipole antenna and generating amplified electric field signals;

at least two magnetic field induction sensors, each induction sensor having a frequency flat band region which includes 1 Hz and a second low-frequency roll-off substantially matched to the first low-frequency roll-off, and being enclosed within a first corrosion- and pressure-resistant case, said at least two induction sensors being disposed horizontally, orthogonal relative to each other;

second conductor means for conducting a power supply voltage to said at least two induction sensors and a magnetic field signal representative of a magnetic field detected by each said induction sensor;

a magnetic field signal amplifier connected to said second conductor means for receiving said magnetic field signal from each said induction sensor and generating amplified magnetic field signals;

a data logging processor for receiving said amplified electric field signals and said amplified magnetic field signals and storing data representative thereof, the data logger being enclosed within a second corrosion- and pressure- resistant case and mounted within said frame structure;

a clocking device for synchronizing operation of said data logging processor with other data logging processors on other units of said plurality of units;

a power supply for providing electrical power to said data logging processor, said at least two induction sensors, said clocking device and said electric field and magnetic field amplifiers;

means for deploying said unit to the seafloor; and means for retrieving said unit from the seafloor.

2. A unit as in claim 1 wherein said retrieving means comprises a navigation system disposed within a third corrosion- and pressure-resistant casing and mounted on said frame structure, said navigation system including an acoustic transponder for receiving an acoustic signal and for providing range and location information for said unit.

3. A unit as in claim 2 wherein said acoustic signal includes a command to release said unit, and said retrieving means further comprises:

a release device responsive to said acoustic signal, wherein said acoustic transponder receives said command to release said unit and activates said release device, separating the frame structure from the deploying means; and a plurality of buoyant floats mounted on said frame structure for providing positive buoyancy to said unit so that it floats to the surface of the seawater.

4. A unit as in claim 3 wherein said release device comprises comprising a voltage supply connected to a burn wire tying said frame structure to the deploying means.

5. A unit as in claim 1 wherein said magnetic field amplifier is AC coupled.

6. A unit as in claim 1 wherein said non-polarizable electrode is silver-silver chloride.

7. A unit as in claim 1 wherein said at least two induction field sensors are attached to said frame structure.

8. A unit as in claim 1 wherein said at least two induction field sensors are attached to said frame work by a cable so that they fall away from said frame structure to drop separately onto the seafloor.

9. A unit as in claim 1 wherein said deploying means comprises an anchor.

10. A unit as in claim 1 wherein said data logging processor includes a removable mass storage device for storing data collected by said data logging processor and for transferring said data for external processing.

11. A unit as in claim 1 wherein said frame structure is formed from aluminum and plastic, with plastic being disposed at least at mounting points of said corrosion- and pressure-resistant cases on said frame structure.

12. A unit as in claim 1 wherein said electric field amplifier has a −3 dB point of 0.1 Hz.

13. A unit as in claim 1 wherein said electric field amplifier has a first stage comprising a power FET chopper with a chopping frequency of 2 kHz.

14. A unit as in claim 1 wherein each said induction sensor has a −3 dB point of 0.2 Hz.

15. A system for magnetotelluric mapping of the seafloor for petroleum exploration, the system comprising:

a seagoing vessel for deploying, controlling and retrieving a plurality of data collection units, said seagoing vessel including an acoustic transmitter for emitting an acoustic signal to the plurality of data collection units and a data analysis system for analyzing data collected by the plurality of data collection units;

each data collection unit of the plurality of data units comprising:

a corrosion-resistant frame structure;

a pair of grounded dipole antennas mounted orthogonally on said frame structure, each dipole antenna comprising at least one boom having a pre-determined total length and a silver-silver chloride electrode disposed at each end of said at least one boom for detecting an electrical current in seawater;

first conductor means for conducting an electric field signal representative of an electric field detected by each said dipole antenna;

an AC-coupled low input impedance, high gain electric field signal amplifier having a first low-frequency roll-off and connected to said first conductor means for receiving said electric field signal and generating an amplified electric field signal;

two magnetic field induction sensors, each induction sensor having a frequency flat band region which includes 1 Hz and being enclosed within a first corrosion- and pressure-resistant case, said two induction sensors being disposed horizontally, orthogonal relative to each other;

second conductor means for conducting a power supply voltage to said two induction sensors and a magnetic field signal representative of a magnetic field detected by each said induction sensor;

a magnetic field signal amplifier connected to said second conductor means for receiving said magnetic field signal from each said induction sensor and generating amplified magnetic field signals;

a data logging processor for receiving said amplified electric field signals and said amplified magnetic field signals and storing data representative thereof, the data logging processor being enclosed within a second corrosion- and pressure- resistant case and mounted within said frame structure;

a clocking device for synchronizing operation of said data logging processor with other data logging processors on other data collection units of the plurality of data collection units;

a power supply for providing electrical power to said data logging processor, said at least two induction sensors, said clocking device and to said electric field and magnetic field amplifiers;

means attached to said frame structure for deploying said data collection unit to the seafloor; and a navigation/release system disposed within a third corrosion- and pressure-resistant casing and mounted on said frame structure, said navigation/release system comprising:

an acoustic transponder for receiving said acoustic signal and for providing range and location information for said unit; and a release device responsive to said acoustic signal, wherein said acoustic transponder receives a command from said acoustic transmitter to release said unit and said release device separates the deploying means from said frame structure;

a plurality of buoyant floats mounted on said frame structure for providing positive buoyancy to said data collection unit so that it floats to the surface of the seawater when said deploying means is released.

16. A system as in claim 15 wherein said data logging processor includes a removable mass storage device for storing data collected by said data logging processor and for transferring said data to said data analysis system.

17. A system as in claim 15 wherein said magnetic field signal amplifier is AC coupled.

18. A system as in claim 15 wherein said two magnetic field sensors are disposed on the frame structure.

19. A system as in claim 15 wherein said two magnetic field sensors are attached to the frame structure by a cable so that they fall away from said frame structure to drop separately onto the seafloor.

20. A system as in claim 15 wherein said electric field signal amplifier has a −3 dB point of 0.1 Hz.

21. A system as in claim 15 wherein each said induction sensor has a −3 dB point of 0.2 Hz.

22. A system as in claim 15 further comprising a land-based local reference magnetic induction sensor and a reference data logging processor for collecting and providing reference data to said data analysis system.

23. A system as in claim 15 further comprising a remote seafloor-based reference magnetic induction sensor and a reference data logging processor disposed up to several hundred kilometers from said plurality of data collection units for collecting and providing reference data to said data analysis system.

24. A system for magnetotelluric mapping of the seafloor for petroleum exploration, the system comprising:

a seagoing vessel for deploying, controlling and retrieving a plurality of data collection units, said seagoing vessel including an acoustic transmitter for emitting an acoustic signal to the plurality of data collection units and a data analysis system for analyzing data collected by the plurality of data collection units;

each data collection unit of the plurality of data units comprising at least:

a corrosion-resistant frame structure;

a pair of grounded dipole antennas mounted orthogonally on said frame structure, each dipole antenna comprising al least one boom having a predetermined total length and a silver-silver chloride electrode disposed at each end of said at least one boom for detecting an electrical current in seawater;

first conductor means for conducting an electric field signal representative of an electric field detected by each said dipole antenna;

an AC-coupled low input impedance, high gain electric field signal amplifier having a first low-frequency roll-off and connected to said first conductor means for receiving said electric field signal and generating an amplified electric field signal;

a data logging processor for receiving said amplified electric field signals and storing data representative thereof, the data logging processor being enclosed within a first corrosion- and pressure- resistant case and mounted within said frame structure;

a clocking device for synchronizing operation of said data logging processor with other data logging processors on other data collection units of the plurality of data collection units;

a power supply for providing electrical power to said data logging processor, said clocking device and to said electric field signal amplifier;

means attached to said frame structure for deploying said data collection unit to the seafloor; and means for releasing said data collection unit from the seafloor; and at least two magnetic field induction sensors, each induction sensor having a frequency flat band region which includes 1 Hz and having a second low-frequency roll-off substantially matched to said first low-frequency roll-off, said two induction sensors being disposed horizontally, orthogonal relative to each other;

a magnetic field signal amplifier for receiving said magnetic field signal from each said induction sensor and generating amplified magnetic field signals representative of magnetic field data;

wherein said data analysis system further analyzes said data collected by the plurality of data collection units in combination with said magnetic field data.

25. A system as in claim 24 wherein each said induction sensor is enclosed within a second corrosion- and pressure-resistant case and connected to said data logging processor by a second conductor means.

26. A system as in claim 25 wherein each said induction sensor is mounted on said frame structure.

27. A system as in claim 24 wherein said at least two induction sensors are deployed at a remote location up to several hundred kilometers from said plurality of data collection units.

28. A system as in claim 24 wherein said remote location is on the seafloor.

29. A system as in claim 24 wherein said remote location is on land.

30. A method for petroleum exploration using magnetotelluric mapping of the seafloor, the method comprising:

deploying from a seagoing vessel a plurality of data collection units by sinking each of the plurality of data collection units to a predetermined location on the seafloor, each data collection unit comprising:

a corrosion-resistant frame structure;

a pair of grounded dipole antennas mounted orthogonally on said frame structure, each dipole antenna comprising al least one boom having a predetermined total length and a silver-silver chloride electrode disposed at each end of said at least one boom for detecting an electrical current in seawater, and first conductor means for conducting an electrical field signal representative of an electric field detected by said dipole antenna to an AC-coupled low input impedance, high gain electric field signal amplifier having a first low-frequency roll-off;

a data logging processor for receiving the electrical signals generated by said pair of dipole antennas through said first conductor means and storing data representative of the electrical signals, said data logger being enclosed within a second corrosion- and pressure resistant case and mounted within said frame structure; and a power supply for providing electrical power to said data logging processor, said clocking device and to the amplifiers for said dipole antennas;

synchronizing operation of said data logging processor with other data logging processors on other data collection units of the plurality of data collection units and collecting data;

emitting an acoustic signal from an acoustic transmitter on said seagoing vessel to an acoustic transponder on each of the plurality of data collection units and receiving a return said acoustic signal from each said data collection unit for providing range and location information;

activating a release device in each said data collection unit, causing said data collection unit to float to the surface;

recovering each data collection unit;

transferring the data collected by the plurality of data collection units to a data analysis system for analysis of the magnetotelluric parameters on the seafloor; and combining the data from the plurality of data collection units in the data analysis system with magnetic field data obtained from at least two magnetic field induction sensors, each induction sensor having a frequency flat band region which includes 1 Hz and having a second low-frequency roll-off substantially matched to the first low-frequency roll-off, said at least two induction sensors being disposed to detect magnetic fields in a horizontal plane.

31. The method of claim 30 wherein the step of deploying the plurality of data collection units comprises positioning the data collection units at a predetermined spacing from each other.

32. The method of claim 30 wherein the step of combining the data comprises attaching two magnetic field induction coils to at least one of the data collection units and inputting the magnetic field data into the data logging processor.

33. The method of claim 30 wherein the step of combining the data comprises obtaining the magnetic field data from at least two remote magnetic field induction sensors positioned on the seafloor at a distance of up to several hundred kilometer from the data collection units.

34. The method of claim 30 wherein the step of combining the data comprises obtaining the magnetic field data from at least two magnetic field induction sensors positioned on land.

* * * * *

UNITED STATES PATENT AND TRADEMARK OFFICE
CERTIFICATE OF CORRECTION

PATENT NO.: 5,770,945

DATED: June 23, 1998

INVENTOR(S): Steven C. Constable

It is certified that error appears in the above-identified patent and that said Letters Patent is hereby corrected as shown below:

Column 11, line 1, "$V_8$" should read --$V_e$--

Column 15, claim 24, line 59, "al" should read --at--

Column 16, claim 30, line 56, "al" should read --at--

Signed and Sealed this

Twenty-seventh Day of March, 2001

Attest:

NICHOLAS P. GODICI

Attesting Officer

Acting Director of the United States Patent and Trademark Office